United States Patent [19]
Konishi

[11] Patent Number: 5,341,179
[45] Date of Patent: Aug. 23, 1994

[54] SOURCE VOLTAGE CONTROL SWITCHING CIRCUIT

[75] Inventor: Hirofumi Konishi, Takatsuki, Japan

[73] Assignee: Matsushita Electric Industrial Co., Ltd., Osaka, Japan

[21] Appl. No.: 911,629

[22] Filed: Jul. 10, 1992

[30] Foreign Application Priority Data

Jul. 19, 1991 [JP] Japan .................. 3-179331

[51] Int. Cl.$^5$ .............................. H04N 5/63
[52] U.S. Cl. .................. 348/730; 348/728; 363/21; 455/3.2; 455/140
[58] Field of Search .......... 363/21; 323/231; 455/3.2, 133, 140, 188.1; 358/190, 188, 181; 348/730, 728; H04N 5/63, 5/44

[56] References Cited

U.S. PATENT DOCUMENTS

| | | | |
|---|---|---|---|
| 4,595,977 | 6/1986 | van der Ohe | 363/21 |
| 4,903,130 | 2/1990 | Kitagawa et al. | 358/190 |
| 5,227,964 | 7/1993 | Furuhata | 363/21 |

FOREIGN PATENT DOCUMENTS

| | | | |
|---|---|---|---|
| 0477891 | 4/1992 | European Pat. Off. | |
| 0493653 | 7/1992 | European Pat. Off. | H04N 5/44 |
| 4306989 | 10/1992 | Japan | H04N 5/63 |
| 2257879 | 1/1993 | United Kingdom | H04N 5/63 |

*Primary Examiner*—Mark R. Powell
*Assistant Examiner*—Jeffrey Murrell
*Attorney, Agent, or Firm*—Stevens, Davis, Miller & Mosher

[57] ABSTRACT

In a BS (direct broadcast by satellite) timer recording mode, a constant voltage diode for controlling 18 V is directly inserted in a power circuit. Alternatively, a delay circuit is inserted at the input of a switching circuit for switching the constant voltage diode, thus absorbing the switching time difference between 140-V control and 18-V control. Therefore, the secondary side output voltages can be prevented from being increased, and the output voltages can be stabilized both in the BS timer recording mode (light load powering) and in the television mode (maximum load powering).

9 Claims, 7 Drawing Sheets

SOURCE VOLTAGE CONTROL SWITCHING CIRCUIT

BACKGROUND OF THE INVENTION

This invention relates to a source voltage control switching circuit for maintaining the source voltages to be stable at the light-load powering time of BS (Direct Broadcasting Satellite) timer recording mode and at the maximum load powering time of television mode.

Recently, most television receivers are of the BS-tuner-built-in type. Thus, a converter switching power source for the BS built-in type has been developed so far.

The source voltage control switching circuit used in the above switching power source will be described with reference to the accompanying drawings.

Figure 5:
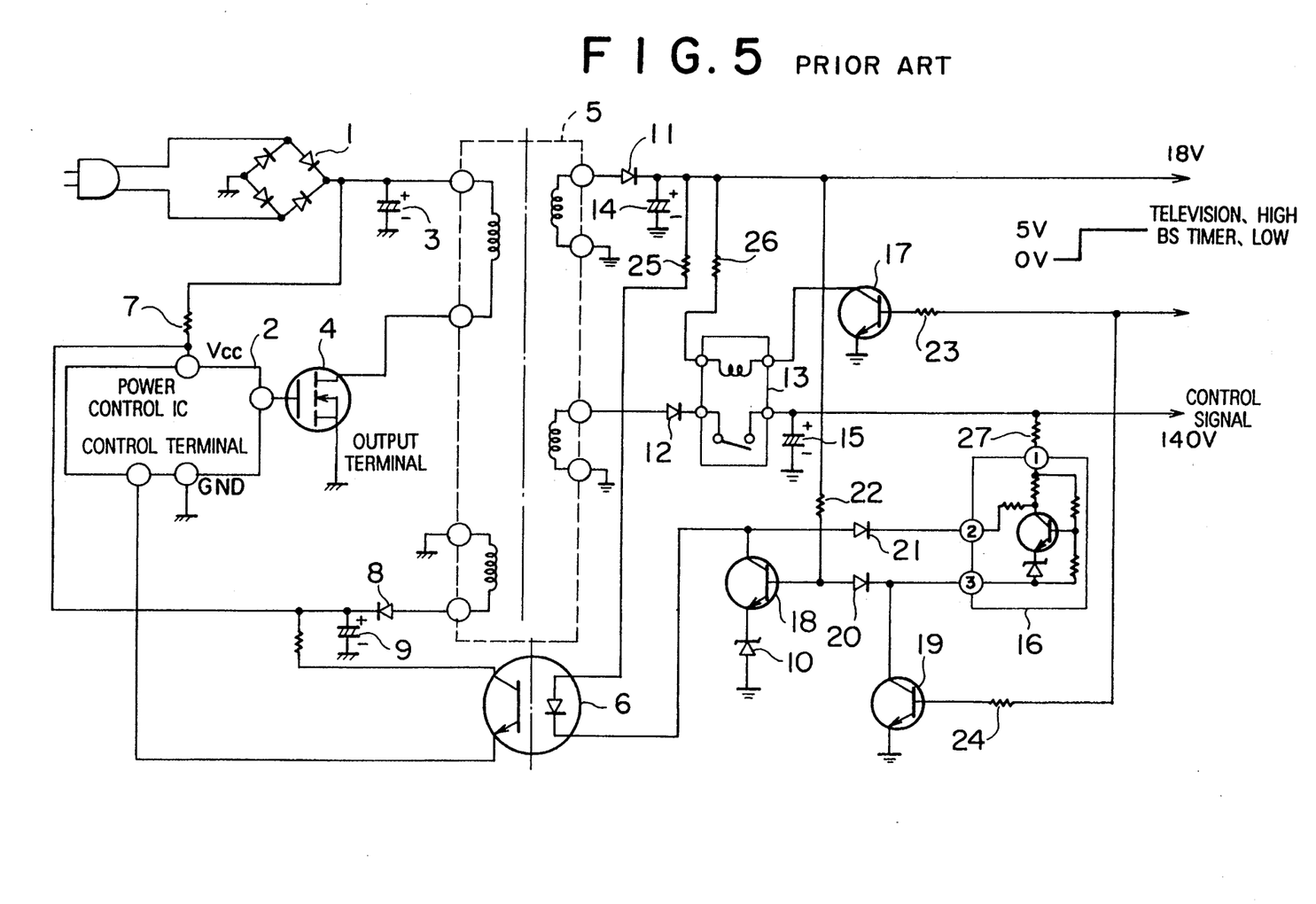
FIG. 5 shows a conventional source voltage control switching circuit.

FIG. 5 shows a conventional source voltage control switching circuit.

Referring to FIG. 5, there are shown an AC rectifying circuit 1, a power control integrated circuit (hereinafter, referred to as the power control IC) 2, a rectifying capacitor 3, a power output MOSFET 4, a power transformer 5, a voltage control feedback photocoupler 6, a start resistor 7, a rectifying diode 8, a rectifying capacitor 9, a 18-V control constant voltage diode 10, rectifying diodes 11, 12, a relay 13 for turning a television source voltage 140 V on and off, rectifying capacitors 14, 15, an error amplifying shunt regulator 16, a relay drive transistor 17, a switching transistor 18 for turning the 18-V control constant voltage diode on and off, a switching transistor 19 for turning the 140-V control error amplifying shunt regulator on and off, and diodes 20, 21 and resistors 22, 23, 24, 25, 26, 27.

The operation of this conventional source voltage control switching circuit will be mentioned below.

When the AC power supply is turned on, the control switching circuit is started through the start resistor 7 so that voltages are induced in the secondary windings of the transformer 5. At the same time, a high-level signal in the television mode is supplied to the bases of the transistors 17 and 19 so that the transistor 17 becomes conductive to energize the relay 13. Thus, upon television reception, the television source voltage 140 V and the BS source voltage 18 V are supplied to the load side. At this time, the transistor 19 is also conductive, thus grounding the 3-pin of the error amplifying shunt regulator 16. Thus, the secondary output voltages are controlled by use of the television source voltage 140 V. In other words, the voltage change fed from the 140-V line through the resistor 27 is converted by the error amplifying shunt regulator 16 into a current change, which is then fed back to the power control IC 2 through the photocoupler 6 so that the source voltages can be stabilized.

In the BS timer recording mode, the voltage to the bases of the transistors 19, 17 becomes low, and thus the transistors 19, 17 are nonconductive. "BS timer recording mode" is a mode in which connection of a relay circuit is cut, the television receiver circuit does not operate and only BS broadcasting signal is receiving condition. Therefore, the relay 13 is deenergized so that the television source voltage is not supplied to the load side, and thus only the BS source voltage is supplied to the load side. At this time, since the transistor 19 is nonconductive, the error amplifying shunt regulator 16 is inoperative. Thus, the secondary output voltages are controlled through the BS source voltage 18 V, the resistor 22, the transistor 18 and the constant voltage diode 10. In other words, the voltage change on the 18-V line is converted into a current change, which is then fed back to the power control IC 2 through the photocoupler 6 so that the source voltages can be stabilized. At this time, the BS source voltage value depends on the voltage value of the constant voltage diode.

Another conventional example will be described below.

Figure 6:
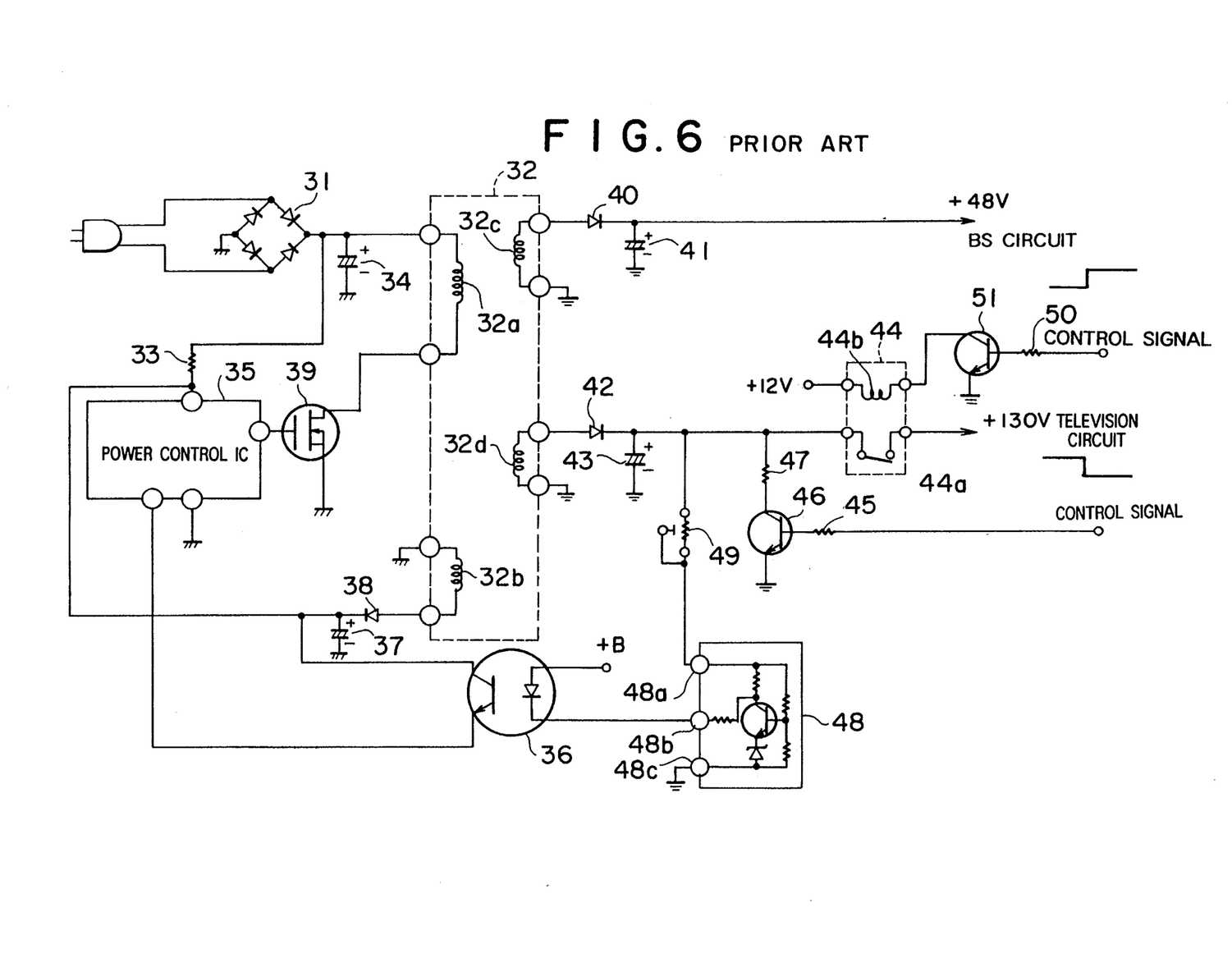
FIG. 6 shows another conventional source voltage switching circuit.
Figure 7:
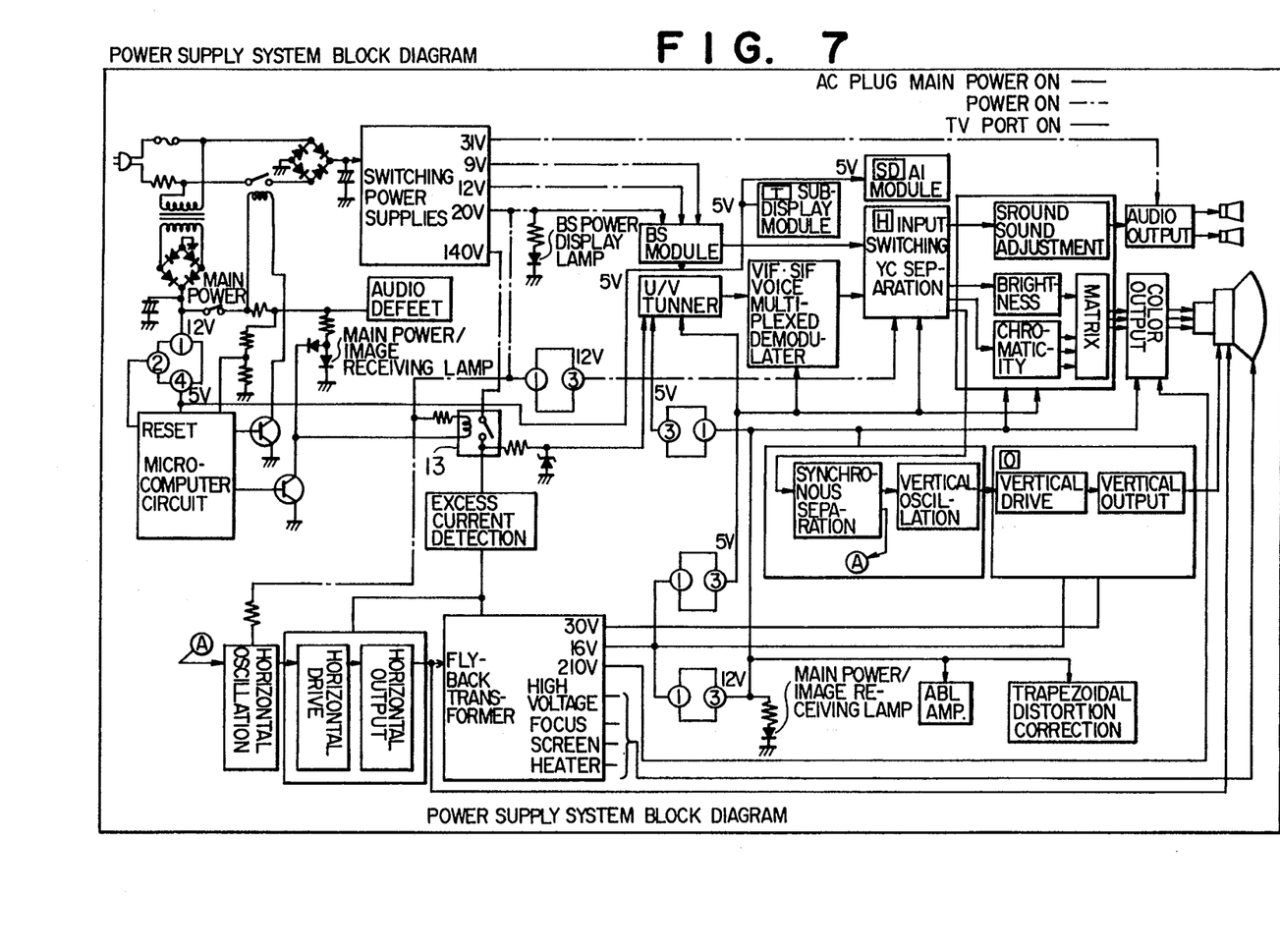
FIG. 7 shows a power supply system block diagram for a television receiver circuit and BS receiver circuit.

FIG. 6 is a circuit diagram of the converter switching power source for the BS tuner built-in television receiver. Referring to FIG. 6, the output end of an AC rectifying circuit 31 is connected to one end of a primary winding 32a of a power transformer 32, to one end of a start resistor 33, and to one end of a rectifying capacitor 34 of which the other end is grounded. The other end of the start resistor 33 is connected (1) to the input terminal of a power control integrated circuit (hereinafter, referred to as the power control IC) 35, (2) to the collector of the phototransistor of a photocoupler 36, (3) to one end of a rectifying capacitor 37 with the other end grounded, and (4) to the cathode of a rectifying diode 38. The emitter of the phototransistor of the photocoupler 36 is connected to the control terminal of the power control IC 35. The anode of the rectifying diode 38 is grounded through the secondary winding, 32b of the power transformer 32. The output terminal of the power control IC 35 is connected to the base of a power output MOS transistor (hereinafter, referred to as MOSFET) 39. The drain of the MOSFET 39 is connected to the other end of the primary winding 32a of the power transformer 32, and the source of the MOSFET 39 is grounded.

One end of a secondary winding 32c of the power transformer 32 of which the other end is grounded is connected to the anode of a rectifying diode 40. The cathode of the rectifying diode 40 is connected to one end of a rectifying capacitor 41 of which the other end is grounded, and to the BS circuit, supplying +48 V to the BS circuit. In addition, one end of a secondary winding 32d of the power transformer 32 of which the other end is grounded is connected to the anode of a rectifying diode 42. The cathode of the rectifying diode 42 is connected to one end of a rectifying capacitor 43 of which the other end is grounded, and to the television circuit through relay contacts 44a of a relay 44, thus supplying +130 V to the television circuit. Also, the collector of a switching transistor 46, of which the emitter is grounded and of which the base is supplied with a low level signal (hereinafter, abbreviated as the L-signal) through a resistor 45 in the television receiving mode and with a high level signal (hereinafter, abbreviated the H-signal) through the resistor 45 in the BS timer recording mode, is connected to the cathode of the rectifying diode 42 through a dummy load resistor 47. An error amplifying shunt regulator 48 has a terminal 48a connected to the cathode of the rectifying diode 42 through a volume control 49, a terminal 48b connected to the cathode of the photodiode of the photocoupler 36 of which the anode is connected to +B power source, and a terminal 48c grounded. Moreover, a relay drive transistor 51 has its emitter grounded, its base supplied with the H-signal through a resistor 50 in the television receiving mode and with the L-signal through the resistor 50 in the BS timer recording mode, and its collector connected through a relay winding 44b of the relay 44 to +12 V source voltage.

The operation of the above construction will be mentioned. First, when the AC power supply is turned on, a source voltage is supplied from the AC rectifying circuit 31 to the input terminal of the power control IC 35 through the start resistor 33. The power control IC 35 produces a signal at its output terminal, causing the MOSFET 39 to perform switching operation. Thus, the power source is actuated so that voltages are induced in the secondary windings 32b, 32c and 32d of the power transformer 32.

In the television receiving mode in which a picture is displayed on the cathode ray tube, as soon as the voltages are induced in the secondary windings 32b, 32c and 32d of the power transformer 2, the H-signal is supplied to the base of the transistor 51, making the transistor 51 conductive so that the relay 44 is energized. Thus, the relay contacts 44a are closed, allowing the television circuit to be supplied with +130 V from the secondary winding 32d so that a picture can be displayed on the cathode ray tube. In addition, the BS source voltage +48 V is supplied from the secondary winding 32c to the BS receiving circuit and so on. At this time, the error amplifying shunt regulator 48 converts the voltage change of the television source voltage +130 V line into a current change, and feeds it through the photocoupler 36 back to the control terminal of the power control IC 35 so that the source voltage of the television power source +130 V line can be stabilized. The base of the transistor 46, in the television receiving mode, is supplied with the L-signal so that the transistor 46 is not conductive.

Then, in the BS timer recording mode in which a BS program is received by only operating the BS receiving circuit and recorded on a VTR, the base of the transistor 51 is supplied with the L-signal so that the transistor 51 is nonconductive. Thus, the relay 44 is not energized so that the relay contacts 44a are opened. Therefore, the television source voltage is not supplied to the load side, or the television circuit, but only the BS source voltage is supplied to the BS receiving circuit. At this time, the base of the transistor 46 is supplied with the H-signal in the BS timer recording mode so that the transistor 46 is conductive, thus connecting the dummy resistor 47 between the television power source +130 V line and ground. The current (several tens of mA) flowing in the dummy load resistor 47, preventing the no-load state. Thus, the source voltage stabilization at the light-load powering time can be achieved by use of the error amplifying shunt regulator 48.

SUMMARY OF THE INVENTION

In the above constructions, however, when switching is made from the BS timer recording mode to the television mode, the voltage control current is easily interrupted for a period (discontinuous period) by the chattering of the relay, switching time difference and so on. Thus, the output voltage may be abnormally increased, breaking the load-side circuits. In addition, in the BS timer recording mode of the light-load powering time, the dummy load resistor 47 is inserted for power source stabilization, thus increasing the power loss with the result that the power efficiency is deteriorated.

Accordingly, it is an object of the invention to provide a power supply not having the above-mentioned problem and a high power efficiency for use in the television receiver.

According to the present invention, to solve the above problem, there is provided a power supply for television receiver having television source voltage detection means for detecting the television source voltage, BS power source voltage detection means for detecting the BS power source voltage, power control means to which the amount of detection is fed back from the television source voltage detection means so that the television source voltage can be controlled to be stable or to which the amount of detection is fed back from the BS source voltage means so that the BS source voltage can be controlled to be stable, and switching means for switching to the stabilization control using the television source voltage detection means in the television receiving mode in which the television circuit and the BS circuit are powered and to the stabilization control using the BS source voltage detection means in the BS timer recording mode in which the television circuit is not powered but the BS circuit is powered.

Moreover, a constant voltage diode is inserted in the primary side control circuit of the power supply so as to provide voltage control at the time of light load, or the constant voltage diode is inserted in the secondary side control circuit so as to provide voltage control at the time of light load, or the constant voltage diode is inserted in the secondary side control circuit and a switching circuit for turning the constant voltage diode on and off and a delay circuit for decreasing the switching speed of the switching circuit are provided.

According to the construction of this invention, since there is no discontinuous period in which the control current does not flow when switching is made from the BS timer recording mode to the television mode, the secondary side output voltage can be prevented from being abnormally increased. In addition, since in the television receiving mode the television source voltage detection means is switched to by switching means so that the television source voltage can be controlled to be stable through the television source voltage detection means or in the BS timer recording mode the BS source voltage detection means is switched to by switching means so that the BS source voltage is controlled to be stable through the BS source voltage detection means without using the television source voltage detection means as in the prior art, stable voltage can be obtained in the BS timer recording mode of light-load powering and in the television receiving mode of high-load powering, and in the BS timer recording mode in which the BS circuit is powered but the television circuit is not powered, the dummy load resistor is not necessary which is used for avoiding the no-load state in the stabilization control using the television source voltage detection means as in the prior art, so that the power efficiency can be improved since the dummy load resistor which consumes some power is not used.

DESCRIPTION OF THE PREFERRED EMBODIMENTS

Various embodiments of the source voltage control switching circuit of the invention will be described with reference to FIGS. 1 to 4.

Figure 1:
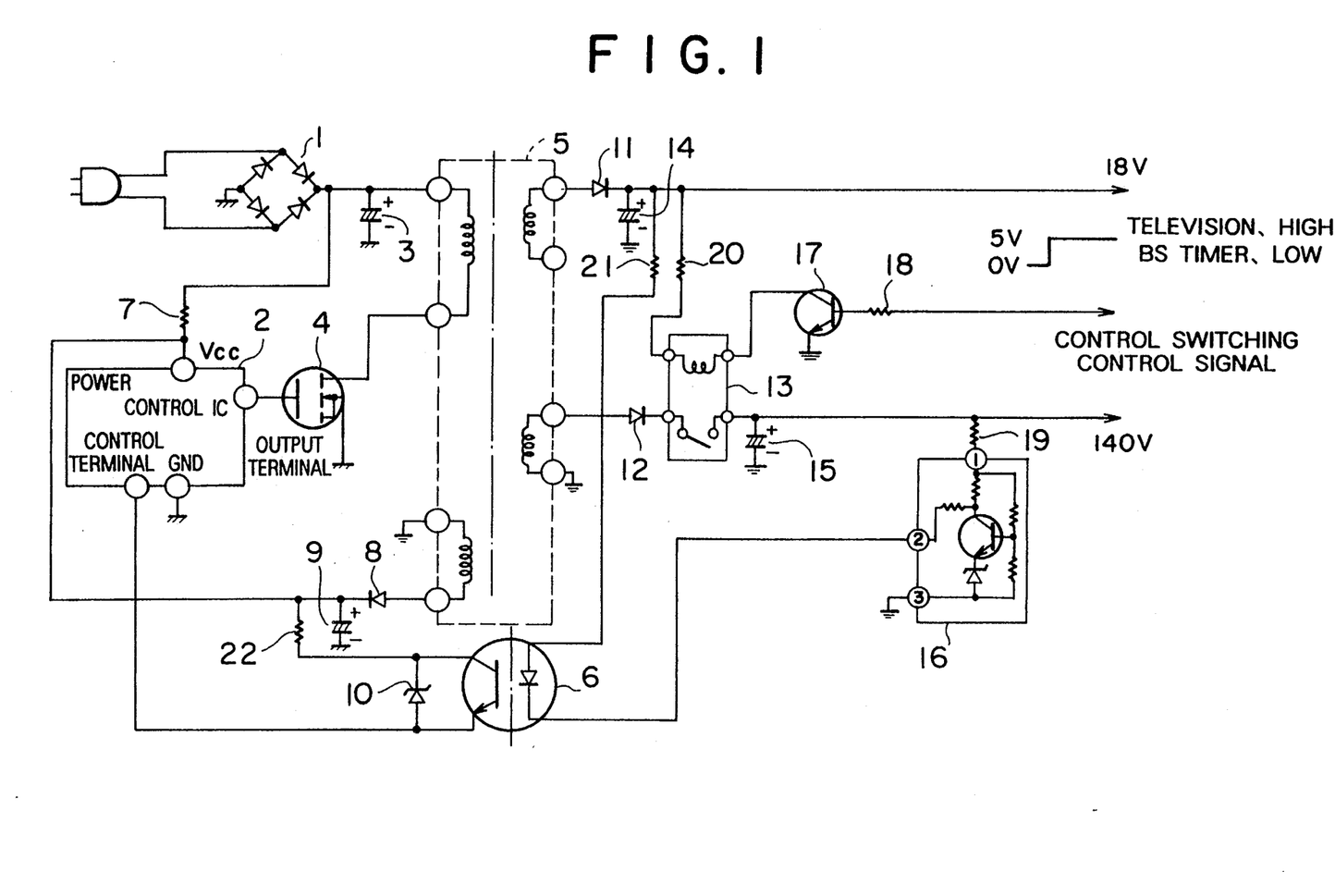
FIG. 1 shows a source voltage control switching circuit in the first embodiment of the invention.

FIG. 1 shows the first embodiment of the invention. Referring to FIG. 1, there are shown an AC rectifying circuit 1, a power control IC 2, a rectifying capacitor 3, a power source output MOSFET 4, a power transistor 5, a voltage control feedback photocoupler 6, a start register 7, a rectifying diode 8, a rectifying capacitor 9, a 18-V controlling constant voltage diode 10, rectifying diodes 11, 12, a relay 13 for turning a 140-V voltage source(television source voltage) on and off, rectifying capacitors 14, 15, a 140-V control error amplifying shunt regulator 16, a relay drive transistor 17, and resistors 18, 19. The operation of the first embodiment constructed above will be described below.

When the AC power supply is turned on, the power supply is actuated through the start resistor 7 so that voltages are induced in the secondary windings of the transformer 5. At the same time, a high-level signal in the television mode is supplied to the base of the transistor 17, making the transistor 17 conductive so that the relay 13 is energized. Therefore, in the television receiving mode, the television source voltage 140 V and the BS source voltage 18 V are supplied to the load side. At this time, the secondary output voltages are controlled by use of the television source voltage 140 V. In other words, the voltage change from the 140-V line through the resistor 19 is converted into a current change by the error amplifying shunt regulator 16 and fed back to the power control IC 2 through the photocoupler 6 so that the source voltage can be stabilized.

In the BS timer recording mode, the base voltage of the transistor 17 becomes low so that the transistor 17 is nonconductive. Thus, the relay 13 is deenergized. At this time, the error amplifying shunt regulator 16 is disconnected from the 140-V line, and thus no control current flows so that the secondary output voltages are increased. When the secondary voltages are increased, the primary drive voltage (the voltage across the smoothing capacitor 9) is increased. Thus, the constant voltage diode 10 becomes conductive so that current flows in the constant voltage diode 10 (a diode which becomes conductive by about 5% increase is selected). The anode of this constant voltage diode 10 is connected to the control terminal of the power control IC 2. The secondary side voltages are controlled by this current.

When switching is made from the BS timer recording mode to the television mode, the transistor 17 is turned on to energize the relay 13 so that 140 V is supplied to the load side. At this time, since the anode voltage of the constant voltage diode 10 is decreased, it is suddenly turned off. The secondary side voltages are controlled by the 140-V error amplifying regulator 16. In other words, when switching is made from the BS timer recording mode to the television mode, even through the discontinuous period in which the 140-V control current does not flowed because of chattering of the relay or the like, the control current flows in the constant voltage diode 10 so as to restrict the increase of the secondary side output voltage to within 5%.

Figure 2:
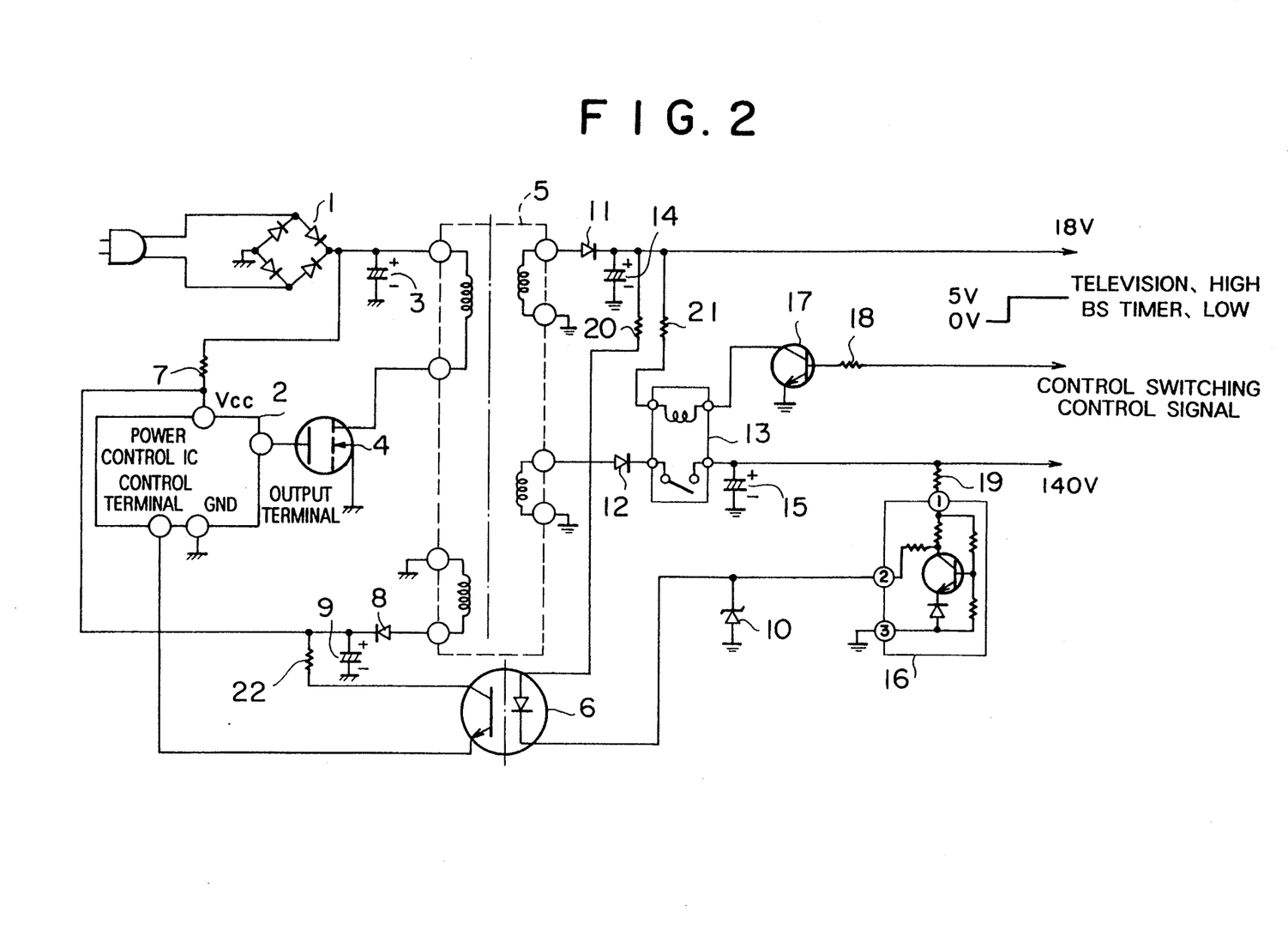
FIG. 2 shows a source voltage control switching circuit in the second embodiment of the invention.

The second embodiment of the invention will be described with reference to FIG. 2.

In the second embodiment, the 18-V control voltage diode 10 in the first embodiment is inserted between the ②-pin and ground of the 140-V control error amplifying shunt regulator 16, so that the same effect as in the first embodiment can be achieved. The detailed description is omitted.

The third embodiment of the invention will be described with reference to FIG. 3.

Figure 3:
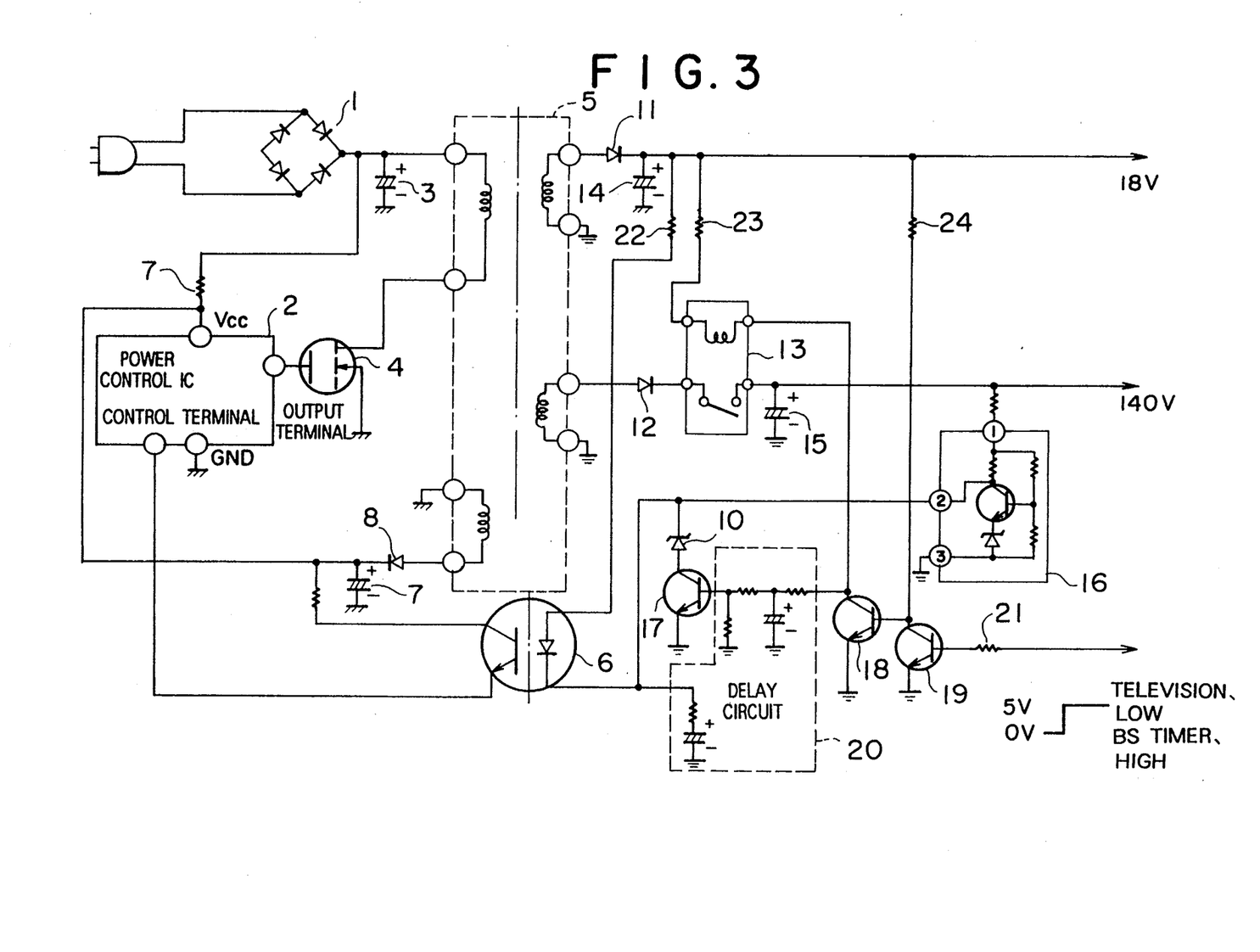
FIG. 3 shows a source voltage control switching circuit in the third embodiment of the invention.

Referring to FIG. 3, in the television mode, the low-level signal is supplied to the base of the transistor 19, so that the transistor 19 is nonconductive and that the transistor 18 is conductive. Thus, the relay 13 is energized, permitting 140 V to be supplied to the load side. At this time, since the transistor 17 is nonconductive, the secondary side voltages are controlled by use of the 140-V error amplifying shunt regulator 16.

In the BS timer recording mode, the high-level signal is supplied to the base of the transistor 19, turning the transistor 19 on, but turning the transistor 18 off so that the relay 13 is deenergized. At this time, since the transistor 17 is conductive, the secondary side voltages are controlled by the constant voltage diode 10.

When switching is made from the BS timer recording mode to the television mode, the relay 13 is energized, but the transistor 17 is nonconductive, so that the secondary voltages are controlled by the 140-V control error amplifying shunt regulator 16. At this time, a delay circuit 20 is inserted at the base of the transistor 17. This delay circuit absorbs the time lag due to chattering time of relay 13 and switching time difference, thus removing the control current discontinuous period, or preventing the secondary side voltages from being abnormally increased upon switching.

Figure 4:
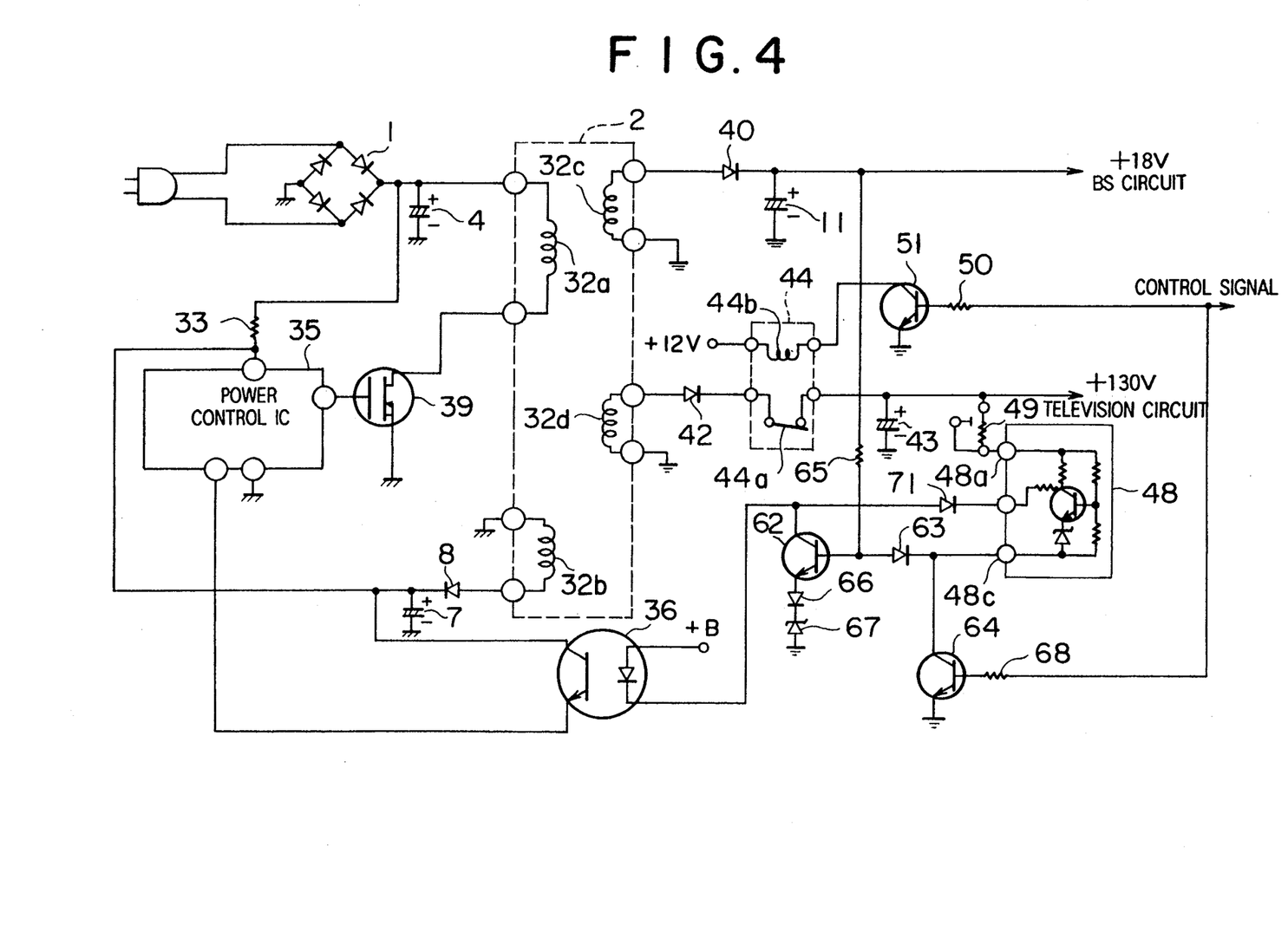
FIG. 4 shows a source voltage control switching circuit in the fourth embodiment of the invention.

The fourth embodiment of the invention will be described with reference to FIG. 4. In FIG. 4, like elements corresponding to those in FIG. 6 are identified by the same reference numerals and will not be described.

FIG. 4 is a circuit diagram of the converter switching power supply for the BS tuner built-in television receiver as the fourth embodiment of the invention. Referring to FIG. 4, one end of the secondary winding 32d of the power transformer 2 of which the other end is grounded is connected through the rectifying diode 42 and through the relay contacts 44a to one end of the rectifying capacitor 43 with the other end grounded, to one end of the volume control 49, and to the television circuit, thus supplying source voltage+130 V to the television circuit. The terminal 48a of the error amplifying shunt regulator 48 is connected to the other end of the volume control 49, and the terminal 48b thereof is connected to the cathode of a rectifying diode 71. The anode of the rectifying diode 71 is connected to the cathode of the photodiode of the photocoupler 36 and to the collector of a shunt regulator transistor 62. The terminal 48c of the error amplifying shunt regulator 48 is connected to the cathode of a rectifying diode 63 and to the collector of a switching transistor 64. The anode of the rectifying diode 63 is connected through a resistor 65 to the cathode of a rectifying diode 40 and to the base of the transistor 62. The emitter of the transistor 62 is grounded through a diode 66 and a constant voltage diode 67. The base of the transistor 64 is connected through a resistor 68 and a resistor 50 to the base of a relay drive transistor 51. The bases of the transistors 51 and 64 are supplied with the H-signal of the control signal in the television receiving mode and with the L-signal of the control signal in the BS timer recording mode.

The television source voltage detection means is formed of the error amplifying shunt regulator 48 and the volume control 49, and detects the error of the television source voltage. The BS source voltage detection means is formed of the transistor 62, the diode 66 and the constant voltage diode 67, and detects the error of the BS source voltage. The transistor 64 as the switching means is responsive to the control signal supplied to its base to switch to the stabilization control using the error of the television source voltage in the television receiving mode in which the television circuit and BS circuit are powered and to the stabilization control using the detection error of the BS source voltage in the BS timer recording mode in which the television circuit is not powered but the BS circuit is powered.

The operation of the converter switching power supply constructed above for the BS tuner built-in television receiver will be described below. When the AC power supply is turned on, the MOSFET 39 is actuated through the start resistor 23 and the power control IC 35 as power control means so as to make switching operation. Thus, voltages are induced in the secondary windings of the power transformer 32, and at the same time the bases of the transistors 51 and 64 are supplied with the H-signal of the control signal in the television mode. The transistor 51 becomes conductive, permitting the relay 44 be energized so that the television source voltage+130 V can be supplied through the relay contacts 44a to the television circuit. Therefore, in the television receiving mode, the television source voltage+130 V and the BS source voltage+18 V are supplied to the load side. At this time, since the transistor 64 is also turned on, the terminal 48c of the error amplifying shunt regulator 48 is grounded through the transistor 64. Thus, the secondary output voltages are controlled by use of the television source voltage+130 V. In other words, the voltage change supplied from the television source voltage+130 V through the volume control 49 to the error amplifying shunt regulator 48 is converted into a current change by the regulator and this current change is fed through the photocoupler 36 back to the control terminal of the power control IC 35, thus stabilizing the secondary source voltages.

In the BS timer recording mode, the bases of the transistors 51 and 64 are supplied with the L-signal of the control signal and thus the transistors 51 and 64 are turned off. Therefore, the relay contacts 44a are opened, disconnecting the television source voltage+130 V from the television circuit on the load side. As a result, only the BS source voltage+18 V is supplied to the BS circuit on the load side. At this time, since the transistor 64 is nonconductive, the error amplifying shunt regulator 48 is inoperative. Thus, the secondary output voltages are controlled by supplying the voltage change from the BS source voltage+18 V line through the resistor 65 to the base of the transistor 62. When the voltage change is supplied to the base of the transistor 62, a current flows from the transistor 62 through the diode 66 and the constant voltage diode 67. In other words, the voltage change on the BS source voltage+18 V is converted into a current change by the transistor 62, and the current change is fed through the photocoupler 36 back to the control terminal of the power control IC 35, thus stabilizing the source voltage. Therefore, the stabilization characteristic of the source voltage in the BS timer recording mode can be greatly improved. Also, since the television voltage source+130 V line is disconnected from the secondary winding by the relay contacts 44a between the rectifying diode 42 and the rectifying capacitor 43, the voltage across the rectifying capacitor 43 becomes 0 V. Thus, the voltage on the television source voltage+130 V line can be prevented from being increased.

According to the source voltage control switching circuit of the invention, when switching is made from the BS timer recording mode to the television mode, the discontinuous period of control current can be avoided from occurring, and the secondary output voltages can be prevented from being abnormally increased upon switching.

Moreover, the stabilization characteristic of the source voltages can be maintained to be satisfactory and the power efficiency can be increased, both in the BS timer recording mode and in the television receiving mode.

I claim:

1. A source voltage control switching circuit for stabilizing output voltages by performing output voltage control using a television source voltage in a television receiving mode and voltage control using a BS (direct broadcast by satellite) source voltage switched to during a BS timer recording mode requiring light-load power, comprising:
   a constant voltage diode for being inserted in a secondary side control circuit of a power supply,
   a switching circuit, operatively associated with said constant voltage diode, for turning said constant voltage diode on and off, and
   a delay circuit for decreasing a switching speed of said switching circuit.

2. A source voltage control circuit according to claim 1, further comprising a photo-coupler device having a primary side and a secondary side and being operatively associated with a primary side and a secondary side of said power supply, wherein said constant voltage diode is connected to said photo-coupler device.

3. A source voltage control circuit according to claim 2, wherein said constant voltage diode is connected to said secondary side of said photocoupler.

4. A source voltage control switching circuit for a power supply device for a television having a television receiving unit and a second receiving unit for receiving direct broadcasts by satellite, said source voltage control switching circuit comprising:
   television source voltage detection means for continually detecting a television source voltage supplied to said television receiving unit and generating a first output;
   second source voltage detection means for detecting a second source voltage supplied to said second receiving unit and generating a second output;
   power source control means, receiving said first and second outputs, for controlling said television source voltage to be stable in response to said first output from said television source voltage detection means and controlling said second source voltage to be stable in response to said second output from said second source voltage detection means; and
   switching means for switching (i) to a first stabilization control mode using said television source voltage detection means in a television receiving mode in which said television receiving unit and said second receiving unit are powered on and (ii) to a second stabilization control mode using said second source voltage detection means in a BS (direct broadcast by satellite) timer recording mode in which said television receiving unit is not powered on and said second receiving unit is powered on.

5. A source voltage control switching circuit for a power supply device for a television set having (i) a television receiving unit and (ii) a second receiving unit for receiving direct broadcasts by satellite, said source voltage control switching circuit switching a power level control signal for stabilizing output of the power supply device in response to a switching control signal representative of a state of operation of the television receiving unit, said source voltage control switching circuit comprising:

(a) a power source circuit comprising (i) a first output terminal for outputting a first power level to the television receiving unit, (ii) a second output terminal for outputting a second power level to the second receiving unit, and (iii) a source voltage control unit having an input terminal for receiving said power level control signal for controlling the first and second power levels;

(b) a power source interrupter for on/off controlling the first power level output from the first output terminal in response to the switching control signal;

(c) first means, operatively associated with said input terminal, for generating and outputting said power level control signal, said power level control signal being derived from said first power level when the television receiving unit is operating and said power level control signal being derived from said second power level when the television receiving unit is not operating; and (d) second means, disposed between said input terminal and said first means, for maintaining said power level control signal provided to said input terminal at a constant value during switching of said power source interrupter.

6. A source voltage control circuit according to claim 5, wherein said first means comprises a photo-coupler device, and said second means comprises a constant voltage diode connected to said photo-coupler device.

7. A source voltage control switching circuit for a power supply device for a television set having (i) a television receiving unit and (ii) a second receiving unit for receiving direct broadcasts by satellite, said source voltage control switching circuit switching a power level control signal for stabilizing output of the power supply device in response to a switching control signal representative of a state of operation of the television receiving unit, said source voltage control switching circuit comprising:

(a) a power source circuit comprising (i) a first output terminal for outputting a first power level to the television receiving unit, (ii) a second output terminal for outputting a second power level to the second receiving unit, and (iii) a source voltage control unit having an input terminal for receiving said power level control signal for controlling the first and second power levels;

(b) a power source interrupter for on/off controlling the first power level output from the first output terminal in response to the switching control signal;

(c) first means, operatively associated with said input terminal, for generating and outputting said power level control signal when the television receiving unit is operating, said power level control signal being derived from said first power level;

(d) second means, operatively associated with said input terminal, for generating and outputting said power level control signal when the television receiving unit is not operating, said power level control signal being derived from said second power level; and (e) third means, disposed between ground and said first means, for maintaining said power level control signal provided to said input terminal at a constant value during switching of said power source interrupter.

8. A source voltage control circuit according to claim 7, wherein said first means comprises a photo-coupler device, and said third means comprises a constant voltage diode connected to said photo-coupler device.

9. A source voltage control circuit according to claim 7, further comprising:

a switching circuit for turning on and off said third means; and a delay circuit for decreasing a switching speed of said switching circuit.

* * * * *